United States Patent [19]

Kitai et al.

[11] Patent Number: 5,163,034
[45] Date of Patent: Nov. 10, 1992

[54] TRACKING DEVICE TO EFFECT TRACKING PULL-IN IN AN OPTICAL RECORDING AND REPRODUCING APPARATUS BY VIBRATING A LIGHT SPOT

[75] Inventors: Hiroto Kitai; Satoshi Shikichi, both of Tokyo; Hideki Hosoya, Kawasaki, all of Japan

[73] Assignee: Canon Kabushiki Kaisha, Tokyo, Japan

[21] Appl. No.: 664,430

[22] Filed: Mar. 4, 1991

Related U.S. Application Data

[63] Continuation of Ser. No. 405,034, Sep. 8, 1989, abandoned, which is a continuation of Ser. No. 48,930, May 13, 1987, abandoned.

[30] Foreign Application Priority Data

May 21, 1986 [JP] Japan ................. 61-114933

[51] Int. Cl.$^5$ ................................................ G11B 7/09
[52] U.S. Cl. ........................ 369/44.29; 235/454; 369/44.28; 369/54
[58] Field of Search ................... 369/32-33, 369/43, 44.25, 44.26, 44.28, 44.29, 44.35, 53, 54, 58, 105-106; 360/2; 235/454, 456; 358/342; 250/201.1, 201.5

[56] References Cited

U.S. PATENT DOCUMENTS

| | | | |
|---|---|---|---|
| 4,118,735 | 10/1978 | Wilkinson | 369/44 |
| 4,234,837 | 11/1980 | Winslow | 358/342 X |
| 4,330,880 | 5/1982 | Van Dijk | 369/32 |
| 4,399,529 | 8/1983 | Leterme et al. | |
| 4,459,690 | 7/1984 | Corsover et al. | 369/46 X |
| 4,462,095 | 7/1984 | Chen | 369/46 X |
| 4,466,087 | 8/1984 | Cheng | 369/46 X |
| 4,494,154 | 1/1985 | Akiyama | 369/32 X |
| 4,549,228 | 10/1985 | Dieterich | 358/342 |
| 4,562,564 | 12/1985 | Bricot et al. | 369/44 |
| 4,592,035 | 5/1986 | Miyasho | 358/342 X |
| 4,598,393 | 7/1986 | Pierce et al. | 369/46 |
| 4,611,315 | 9/1986 | Ogino | 369/44 X |
| 4,613,963 | 9/1986 | Hirano | 369/32 X |
| 4,627,038 | 12/1986 | Abed et al. | 369/44 |
| 4,646,278 | 2/1987 | Okano | 369/32 |
| 4,677,602 | 6/1987 | Okano et al. | 369/46 X |
| 4,697,258 | 9/1987 | Overath et al. | 369/44 |
| 4,701,898 | 10/1987 | Giddings | 369/32 |
| 4,727,532 | 2/1988 | Giddings | 369/32 X |
| 4,787,075 | 11/1988 | Matsuoka et al. | 235/454 X |

FOREIGN PATENT DOCUMENTS

| | | |
|---|---|---|
| 0040995 | 12/1981 | European Pat. Off. |
| 0056920 | 4/1982 | European Pat. Off. |
| 0079109 | 5/1983 | European Pat. Off. |
| 0089274 | 9/1983 | European Pat. Off. |
| 0144058 | 6/1985 | European Pat. Off. |
| 0166614 | 1/1986 | European Pat. Off. |

*Primary Examiner*—Wayne R. Young
*Attorney, Agent, or Firm*—Fitzpatrick, Cella, Harper & Scinto

[57] ABSTRACT

A tracking device usable in an optical information recording and reproducing apparatus for an optical information record medium on which a plurality of tracks are arranged substantially parallel in a first direction. The device includes a light source, a first optical system for forming a small spot on the record medium by converging a light beam from the light source, a second optical system for obtaining the light beam from the record medium, a detecting device for receiving the light beam obtained by the second optical system to output a tracking signal, a vibrating device for vibrating the spot relative to the record medium in a second direction intersecting the first direction, a control device for effecting tracking control with respect to a track, and a selecting device for selectively actuating the vibrating device and the control device in accordance with the tracking signal from the detecting device.

19 Claims, 8 Drawing Sheets

TRACKING DEVICE TO EFFECT TRACKING PULL-IN IN AN OPTICAL RECORDING AND REPRODUCING APPARATUS BY VIBRATING A LIGHT SPOT

This application is a continuation of prior application, Ser. No. 07/405,034 filed Sep. 8, 1989, which application is a continuation of prior application, Ser. No. 07/048,930 filed May 13, 1987, both now abandoned.

BACKGROUND OF THE INVENTION

1. Field of the Invention

The present invention relates to an optical information recording and reproducing apparatus for recording information on an optical information recording medium, reproducing the information recorded on the medium and/or erasing the information recorded on the medium. Such an information recording and reproducing apparatus is suitable for use as an information recording and reproducing apparatus which uses a card-like information recording medium on which a plurality of linear information tracks are arranged in parallel.

2. Related Background Art

As a medium for recording information by using light and reading the information thus recorded, disk-shaped, card-shaped and tape-shaped media have been known. Of those, the card-shaped optical information recording medium (hereinafter referred to as an optical card) is compact and light in weight, convenient to carry and has a large memory capacity. Accordingly, a big demand is expected.

On such an optical card, information is recorded as a line of optically detectable record bits (information track) by scanning the card by a light beam which is modulated by recording information and focused into a small spot. In order to exactly record information without trouble such as crossing of information tracks, it is necessary to control (autotracking or AT) an irradiation position of the light beam spot on the optical card in a direction normal to a scan direction. In order to irradiate the light beam as a stable small spot irrespective of curvature of the optical card or mechanical tolerance, it is necessary to control (auto-focusing or AF) the light beam spot in a direction normal to the optical card surface. Further, in order to compensate for any variation in scan speed, it is necessary to obtain a clock signal. In a reproducing operation, the AT and AF are also required.

Accordingly, a tracking track, a clock track or other preformat data is formed on the optical card.

FIG. 1 shows a plan view of a known optical card having a preformat. On an optical card 101, clock tracks $2_1$, $2_2$, $2_3$ ... having clock signals recorded thereon to form discontinuous broken lines and tracking tracks 31, 32, 33, ... formed in continuous lines, are alternately arranged at a constant interval. Record areas $4_1$, $4_2$, $4_3$ ... for recording information are provided one for each of the tracks. The optical card 101 has record areas between the clock tracks and the tracking tracks.

FIG. 2 shows a configuration of an optical card information recording and reproducing apparatus. Numeral 106 denotes a motor for driving an optical card 101 in a direction shown by arrow A, numeral 107 denotes a light source such as a semiconductor laser, numeral 108 denotes a collimator lens, numeral 119 denotes a diffraction grating, numeral 110 denotes an objective lens, numeral 109 denotes a beam splitter, numeral 111 denotes a tracking coil, numeral 112 denotes a focusing coil, numerals 113 and 114 denote condenser lenses, numerals 115 and 116 denote photo-electric conversion elements, numeral 117 denotes a tracking control circuit, and numeral 118 denotes a focusing control circuit. Currents are supplied to the tracking coil 111 and the focusing coil 112 under the control of the control circuits 117 and 118 in accordance with signals detected by the photo-electric conversion elements 115 and 116 so that the objective lens is driven to carry out AT and AF. The photoelectric conversion elements 115 and 116 produce clock signals and reproducing signals. The optical card information recording and reproducing apparatus is constructed by elements other than the optical card 101 and the motor 106 shown in FIG. 2.

A method for recording and reproducing information to and from the optical card by such an apparatus will now be explained.

In the apparatus shown in FIG. 2, a light beam emitted from the light source 107 is collimated by the collimator lens 108 and it is split by the diffraction grating 119 into three beams of different travelling angles with respect to a direction normal to the plane of the drawing. Those beams are reflected by the beam splitter 109 and form three beam spots on the information record plane of the optical card 101 through the objective lens 110.

FIG. 3 shows a partial enlarged plan view of the information record plane of the optical card 101.

When information is to be recorded on the optical card 101, spots $S_1$, $S_2$ and $S_3$ are formed on the information record plane with the spot $S_1$ being on the clock track $2_1$ and the spot $S_3$ being on the tracking track $3_1$. By relatively moving the optical head, which forms the spots, and the optical card, the spots $S_1 \sim S_3$ are scanned in a direction a. A clock signal is reproduced from a reflection light of the spot $S_1$. A reflection light of the spot $S_3$ is directed to the photoelectric conversion element 115 in the optical head, and a tracking signal is produced in the tracking control circuit 117 by a known method such as a push-pull method. The tracking coil 111 is energized in accordance with the tracking signal to horizontally drive the objective lens 110. Thus, the spots $S_1$, $S_2$ and $S_3$ are moved together, normal to the scan direction to perform auto-tracking. Thus, record bits 5 are recorded on the record area $4_1$ by the spot $S_2$ along the tracking track $3_1$. When information is to be recorded on the record area $4_2$, the spots $S_1'$, $S_2'$ and $S_3'$ are irradiated as shown and a clock signal is reproduced from the clock track $2_2$ by the spot $S_3'$ and a tracking signal is reproduced from the tracking track $3_1$ by the spot $S_1'$. Information is recorded by the spot $S_2'$ while the autotracking is carried out. In this manner, information can be recorded on all areas of the record area.

FIG. 4 shows a partial enlarged plan view of the information record plane of the optical card 101.

When information recorded on the optical card is to be reproduced, an intensity of the light beam spot to be irradiated to the record bits need not be too high. Therefore, two lines may be simultaneously read. Namely, the spots $S_1$, $S_2$ and $S_3$ are irradiated to the record track $25_1$, tracking track $3_1$ and record track $25_2$. Those spots are scanned in the direction a as was done in the record mode. Since no clocking is required in the reproducing mode, the clock track is not irradiated. A tracking signal is reproduced from the reflection light of the spot $S_2$ and signals are reproduced from the reflection lights of the spots $S_1$ and $S_3$.

In the recording and reproducing of information by the light beam, it is necessary to position the light beam spot to the predetermined tracking track to effect the AT control (AT pull-in of the light beam spot).

In the AT pull-in of the light beam, the optical head is moved to the vicinity of the target track, the light beam spot is formed on the record medium surface, and after a sufficient in-focus state has been attained, the AT servo system is activated to carry out the AT pull-in for the target track.

As shown in FIG. 3, tracks are formed on the optical card or record medium parallel to the scan direction of the light beam spot (direction a shown in FIG. 3).

Accordingly, if the light beam spot is formed in the AT pull-in mode at an intermediate point between the tracks on the record medium, the AT pull-in is not attained.

In the prior art optical card recording and reproducing apparatus, the entire optical head is moved orthogonally to the tracks of the optical card (direction b in FIG. 6) and when the tracking light beam spot reaches the position corresponding to the desired tracking track, the AT control is started so that the AT pull-in is attained for the target track.

However, when the optical head is to be moved to cause the light beam spot to move across the tracks, the actuator is rapidly driven and the light beam spot moves beyond the desired tracking track and the AT pullin is not attained for the target track. In order to attain exact AT pull-in in this method, it is necessary to slow down the drive speed of the optical head and hence, a long time is required to attain the AT pull-in.

As shown in FIG. 7, it has been proposed to scan the tracking light beam spot slightly obliquely (direction c) with respect to the direction of the tracking track $3_2$ so that the light beam spot crosses the tracking track and the AT pull-in is carried out during the period.

However, this method requires a relatively long distance scan and hence requires a long time to attain the AT pull-in.

SUMMARY OF THE INVENTION

It is an object of the present invention to provide an optical information recording and reproducing apparatus which solves the problems encountered in the prior art apparatus and allows exact and rapid AT pull-in.

In order to achieve the above object, in accordance with the present invention, information is recorded on an optical information recording medium, information recorded on the recording medium is reproduced and/or information recorded on the recording medium is erased while a light beam spot is reciprocated relative to an information track on the recording medium with tracking and/or focusing operations. When the light beam spot is beyond a control area of a tracking servo loop, the light beam spot is taken off the loop and vibrated across the track at an amplitude corresponding to the track pitch, and when the light beam spot comes into the control area of the loop, the loop is activated. As a result, exact and rapid AT pull-in is attained.

BRIEF DESCRIPTION OF THE DRAWINGS

FIGS. 6 and 7 illustrate conventional AT pull-in.

DESCRIPTION OF THE PREFERRED EMBODIMENTS

Figure 8:
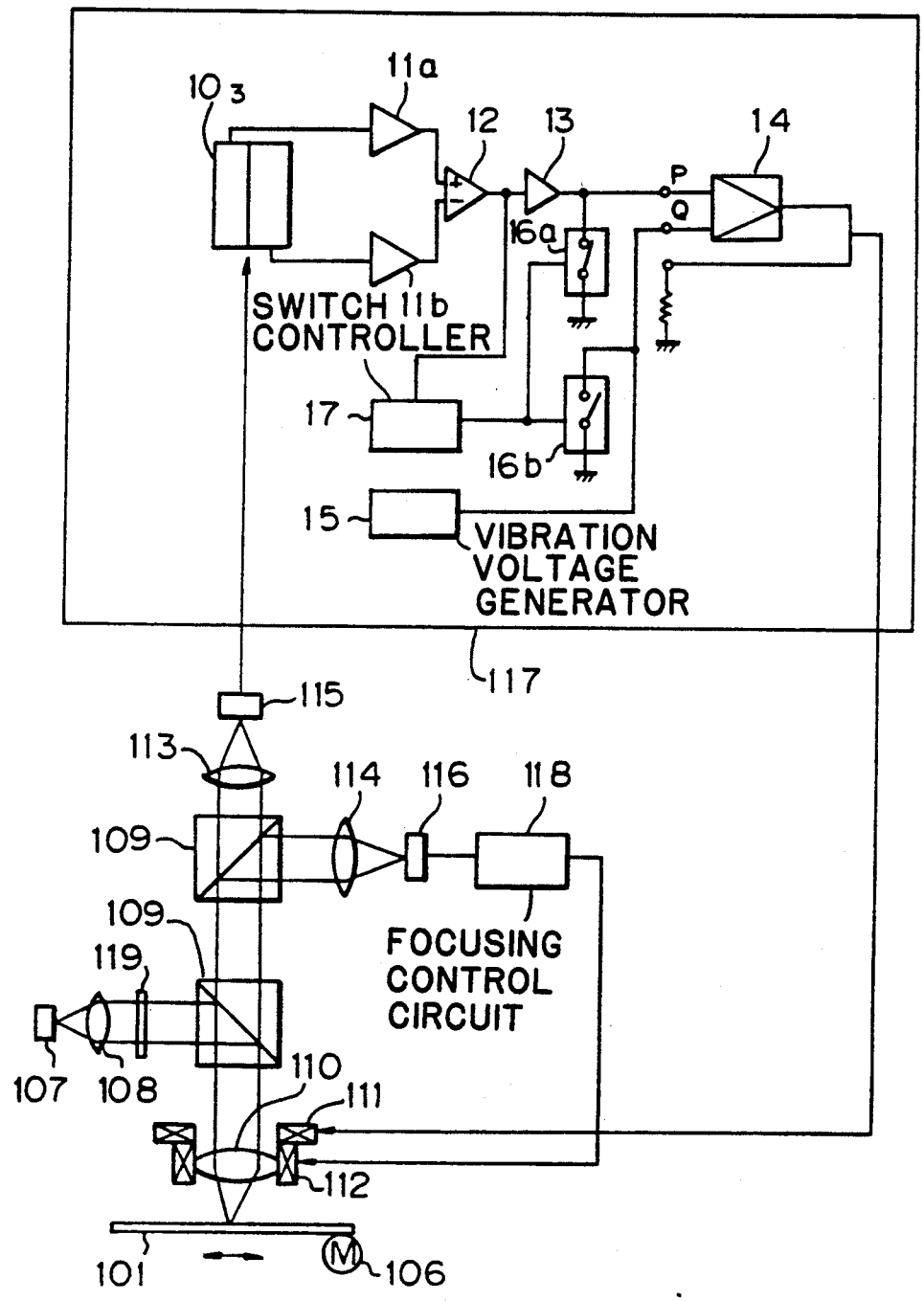
FIG. 8 shows a block diagram of an AT pull-in control unit of the present apparatus.

FIG. 8 shows a block diagram of an AT pull-in control unit of an optical card recording and reproducing apparatus, in accordance with one embodiment of the optical information recording and reproducing apparatus of the present invention.

Figure 1:
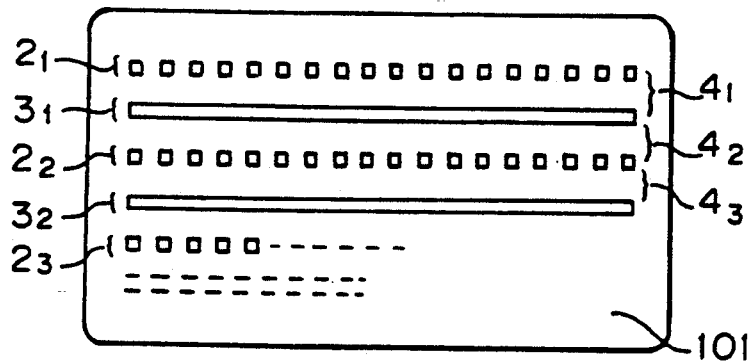
FIG. 1 shows a plan view of an optical card.
Figure 2:
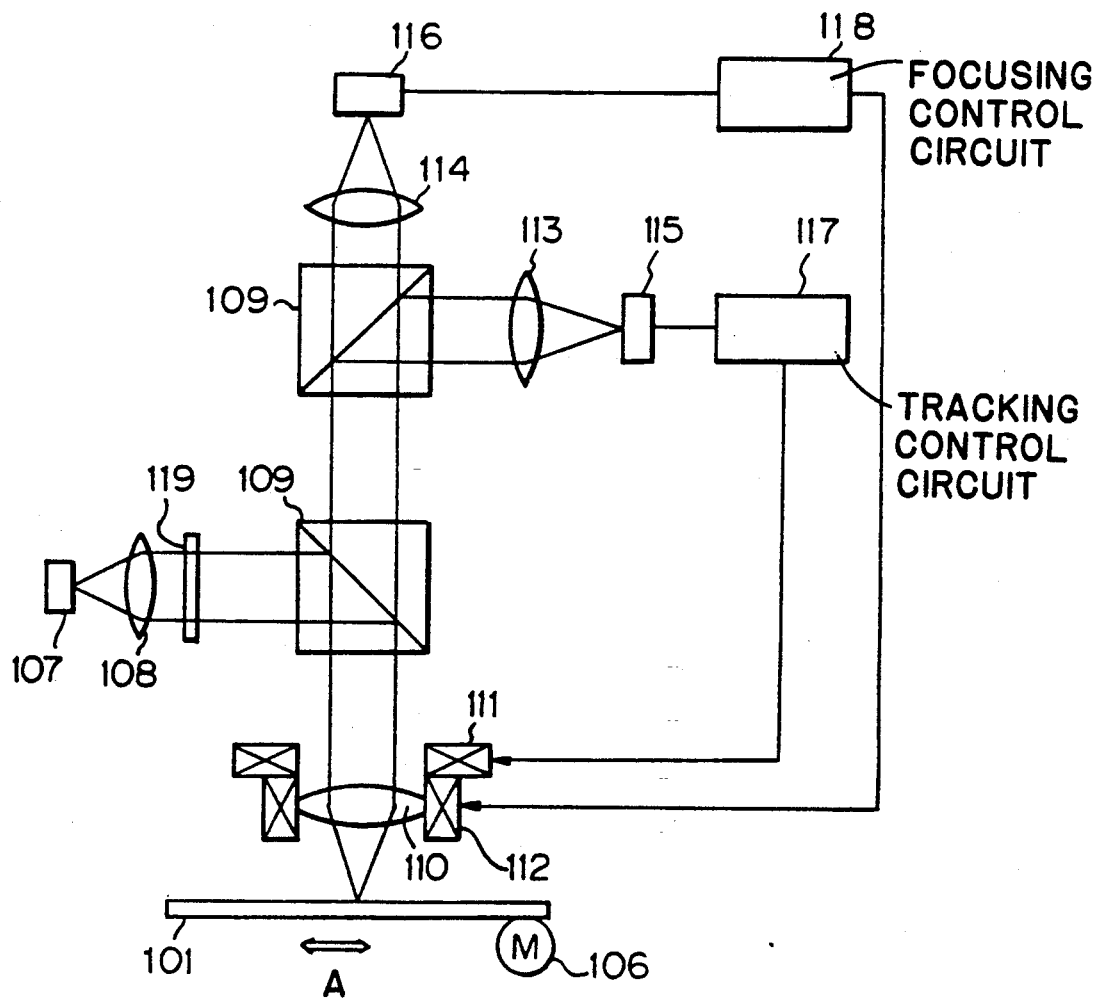
FIG. 2 shows a configuration of an optical card recording and reproducing apparatus.

The apparatus of the present embodiment has an overall configuration similar to that shown in FIG. 2. A photo-electric conversion element 115 has three two-split sensors corresponding to three light beams, as described in connection with FIG. 2.

Figure 9:
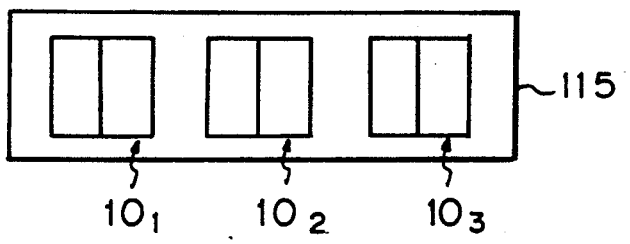
FIG. 9 shows a front view of a photo-electric conversion element.

FIG. 9 shows a front view of the photo-electric conversion element 115. Numerals $10_1 \sim 10_3$ denote two-split sensors each having two sensing areas.

Figure 3:
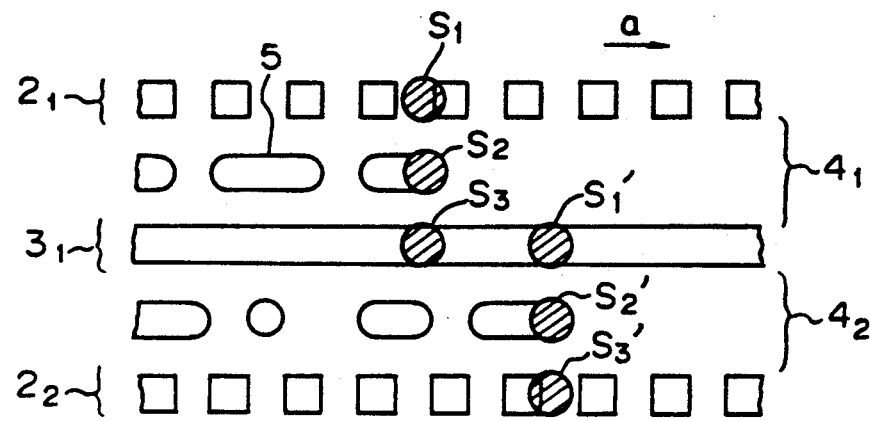
FIGS. 3, 4, 5, 10, 11, 13 and 14 show partial enlarged plan views of optical card information record planes.

FIG. 8 shows only one of the three two-split sensors of the photo-electric conversion element 115. In order to attain the information recording status shown by the light beam spots $S_1 \sim S_3$ in FIG. 3, the spot $S_3$ is used for tracking and the spot $S_3$ is focused onto the two-split sensor $10_3$.

Outputs from the sensing areas of the two-split sensor $10_3$ are supplied to sensor amplifiers 11a and 11b, respectively, and outputs from the amplifiers are supplied to an operational circuit 12, which produces a differential signal of two inputs thereto. The output of the operational circuit 12 is supplied to a terminal P of a driver amplifier 14 through a buffer 13. Numeral 15 denotes a vibration voltage generation circuit, an output of which is applied to a terminal Q of the driver amplifier 14. One terminal of a switch 16a is connected to the buffer 13 and the terminal P, and the other terminal of the switch 16a is grounded. Similarly, one terminal of a switch 16b is connected to the vibration voltage generation circuit 15 and the terminal Q and the other terminal of the switch 16b is grounded. Numeral 17 denotes a control circuit which receives the output of the operational circuit 12. The control circuit 17 produces ON/OFF control signals for the switches 16a and 16b. The output of the driver amplifier 14 is supplied to a tracking coil 111. Numeral 110 denotes an objective lens.

The sensor amplifiers 11a and 11b, operational circuit 12, buffer 13 and driver amplifier 14 form a portion of the tracking control circuit 117 of FIG. 2.

In the present embodiment, the optical head is moved to the vicinity of the target track and the light beam spot is formed on the surface of the recording medium. After a sufficient in-focus state has been attained, electrical signals of an image of the light beam spot $S_3$ detected by the two-split sensor $10_3$ are supplied from the sensor amplifiers 11a and 11b to the operational amplifier 12 in which a differential signal is produced and is supplied to the buffer 13. On the other hand, the vibration voltage generation circuit 15 generates a sawtooth wave or sine wave vibration voltage.

Figure 10:
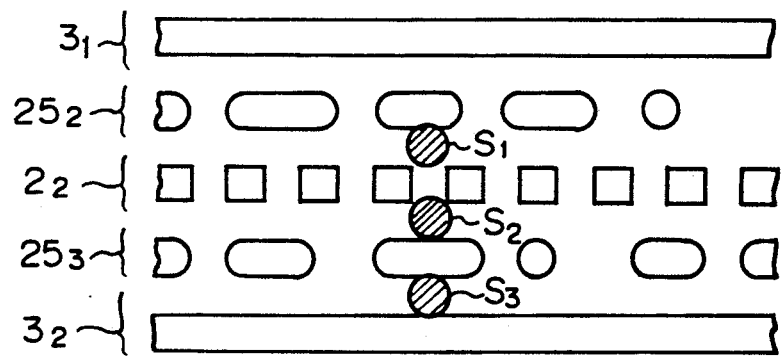
Figure 12:
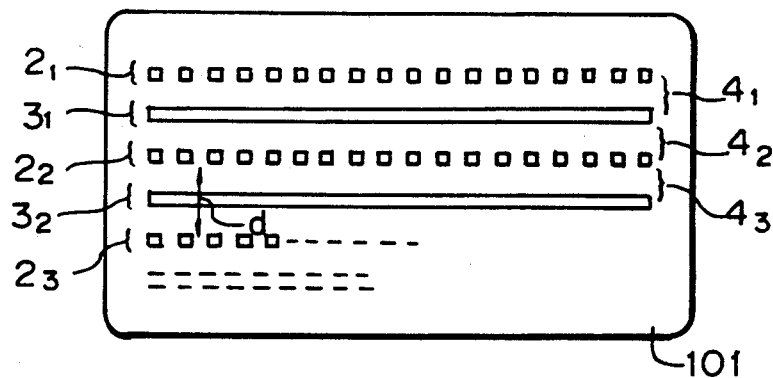
FIG. 12 illustrates AT pull-in in the present invention.

As shown in FIG. 10, when the light beam spot $S_3$ is at a position other than the tracking track $3_2$ of the information recording medium, the same amount of light is directed to each sensing area of the two-split sensor $10_3$ and the sensor amplifiers $11a$ and $11b$ produce the same output and the output of the operational circuit 12 is zero. Accordingly, no input is applied to the control circuit 17. Thus, the control circuit 17 produces a signal to close (ON) the switch $16a$ and open (OFF) the switch $16b$ so that the switches assume the positions shown in FIG. 8. (After the AT servo has been later turned on, the control circuit 17 does not produce a signal to reset the switches $16a$ and $16b$ even after the output of the operational circuit 12 has assumed zero). Accordingly, no input is applied to the terminal P of the driver amplifier 14 and the vibration voltage is applied to the terminal Q. The voltage signal is converted by the driver amplifier to a current signal, which is supplied to the coil 111. Thus, the objective lens 110 is vibrated across the track. A direction d of vibration of the light beam spot $S_3$ is shown in FIG. 12. An amplitude of the vibration is preferably equal to a track pitch so that the spot $S_3$ moves across the target track $3_2$. If a period of vibration is too short, a velocity of the light beam spot to move across the track is too fast to attain the AT pull-in. Accordingly, it is preferably long enough to allow the AT pull-in depending on a gain of the AT servo system. In the experience of the inventors, the AT pull-in was attained for velocity of up to 5 μm/msec.

Figure 11:
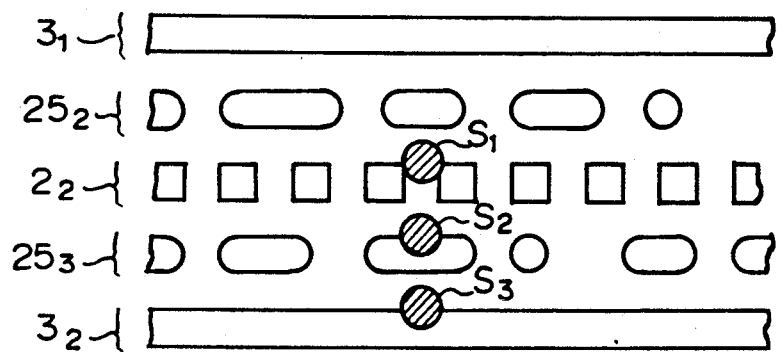

As the objective lens 110 starts to vibrate, the light beam spot $S_3$ begins to move across the tracking track $3_2$ as shown in FIG. 11. At this time, the amount of light directed to the two sensing areas of the two-split sensor $10_3$ are different and the outputs of the sensor amplifiers $11a$ and $11b$ are different. Thus the operational circuit 12 produces an output. This output is supplied to the control circuit 17 which compares it with a predetermined threshold level. The control circuit 17 produces a signal to turn off the switch $16a$ and turn on the switch $16b$. As a result, the input to the terminal Q of the driver amplifier 14 is terminated and the output of the operational circuit 12 is supplied to the driver amplifier 14 through the buffer 13 and the terminal P.

In this manner, the AT servo control is activated at the target track and the AT pull-in is attained.

Under this condition, the recording medium is moved relative to the optical head along the track while the AT servo system is operated to record, reproduce and/or erase information.

Figure 4:
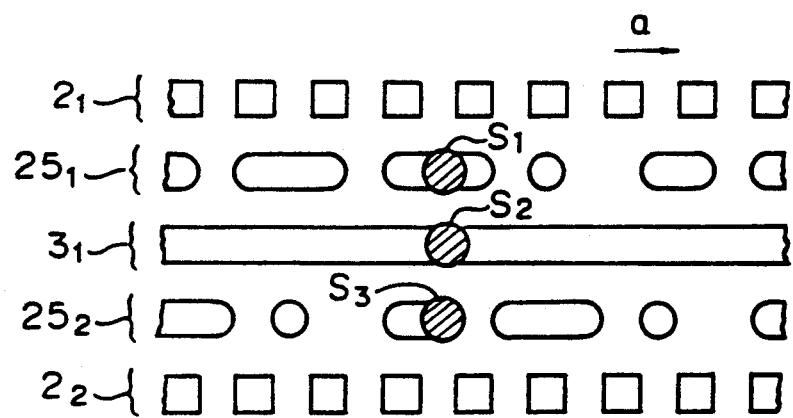
Figure 5:
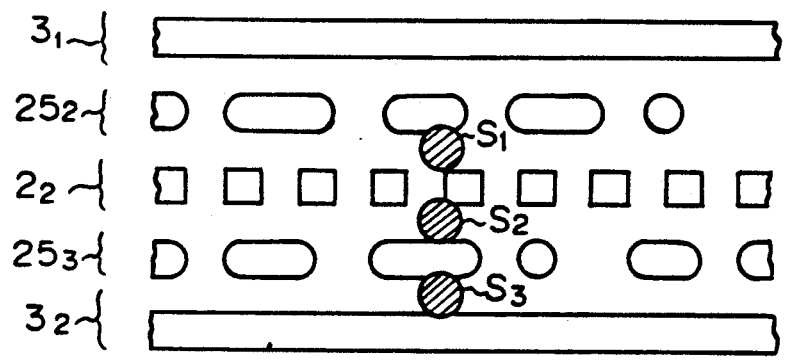
Figure 6:
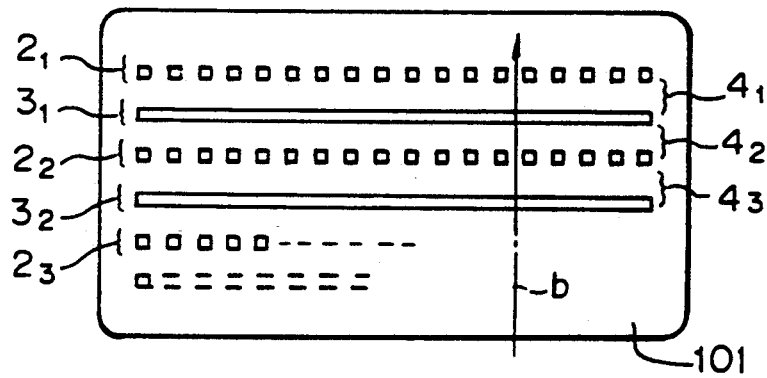
Figure 7:
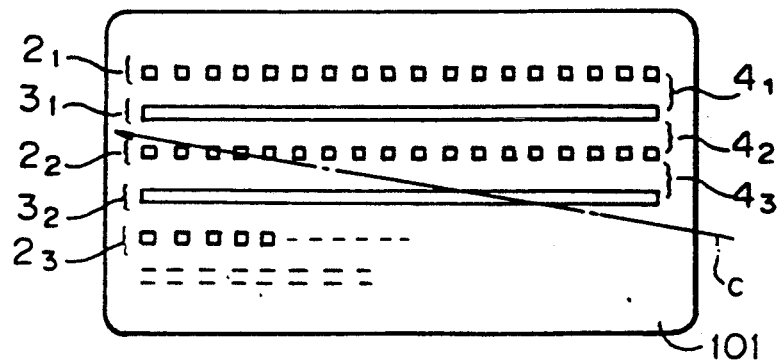

In the above embodiment, the light beam spot $S_3$ is used for tracking. When the light beam $S_1'$ (shown in FIG. 3) or the light beam $S_2$ (shown in FIG. 4) is used for tracking, the AT pull-in may be similarly attained by utilizing the signals derived from the two-split sensors $10_1$ and $10_3$.

Figure 13:
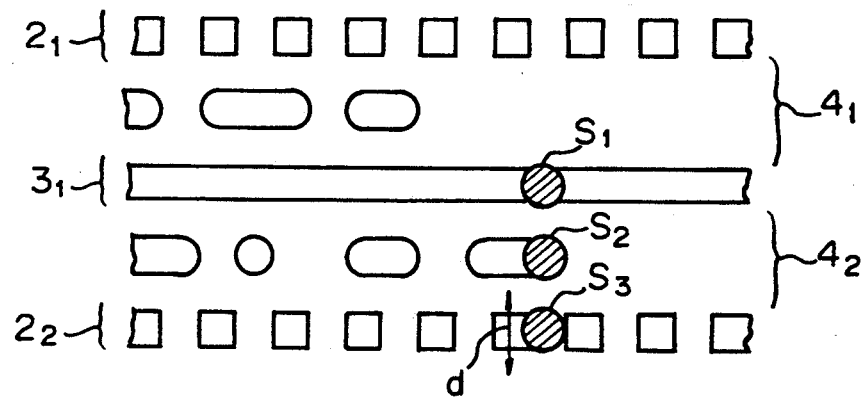
Figure 14:
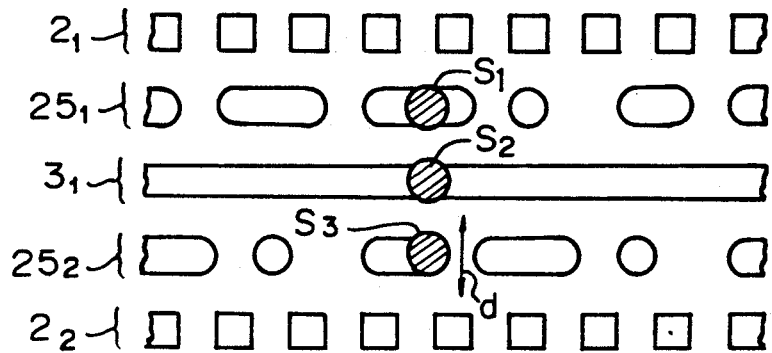

In the above embodiment, the AT pull-in is attained by utilizing the tracking track. Alternatively, the AT pull-in may be attained by utilizing another track available for tracking, that is, the clock track $2_2$ of the information recording medium as shown in FIG. 13. When information is to be reproduced, the AT pull-in may be attained by utilizing the record area $25_2$ formed on the information recording medium as shown in FIG. 14.

In the above embodiment, the objective lens 110 is vibrated by utilizing the tracking coil 111. Alternatively, a separate vibration coil may be provided to vibrate the objective lens. The vibration and drive means for the objective lens is not limited to electromagnetic means, but it may be other means such as a piezoelectric element.

In accordance with the present invention, the optical head is driven to the vicinity of the target track, the light beam spot is formed on the surface of the recording medium and after a sufficient in-focus state has been attained, the tracking servo system is activated. If the light beam spot is beyond the control area of the tracking servo loop, the light beam spot is taken out of the servo loop and vibrated across the track at the amplitude equal to the track pitch. When the light beam spot is within the control area of the loop, the loop is activated. In this manner, exact and rapid AT pull-in is attained.

Figure 15:
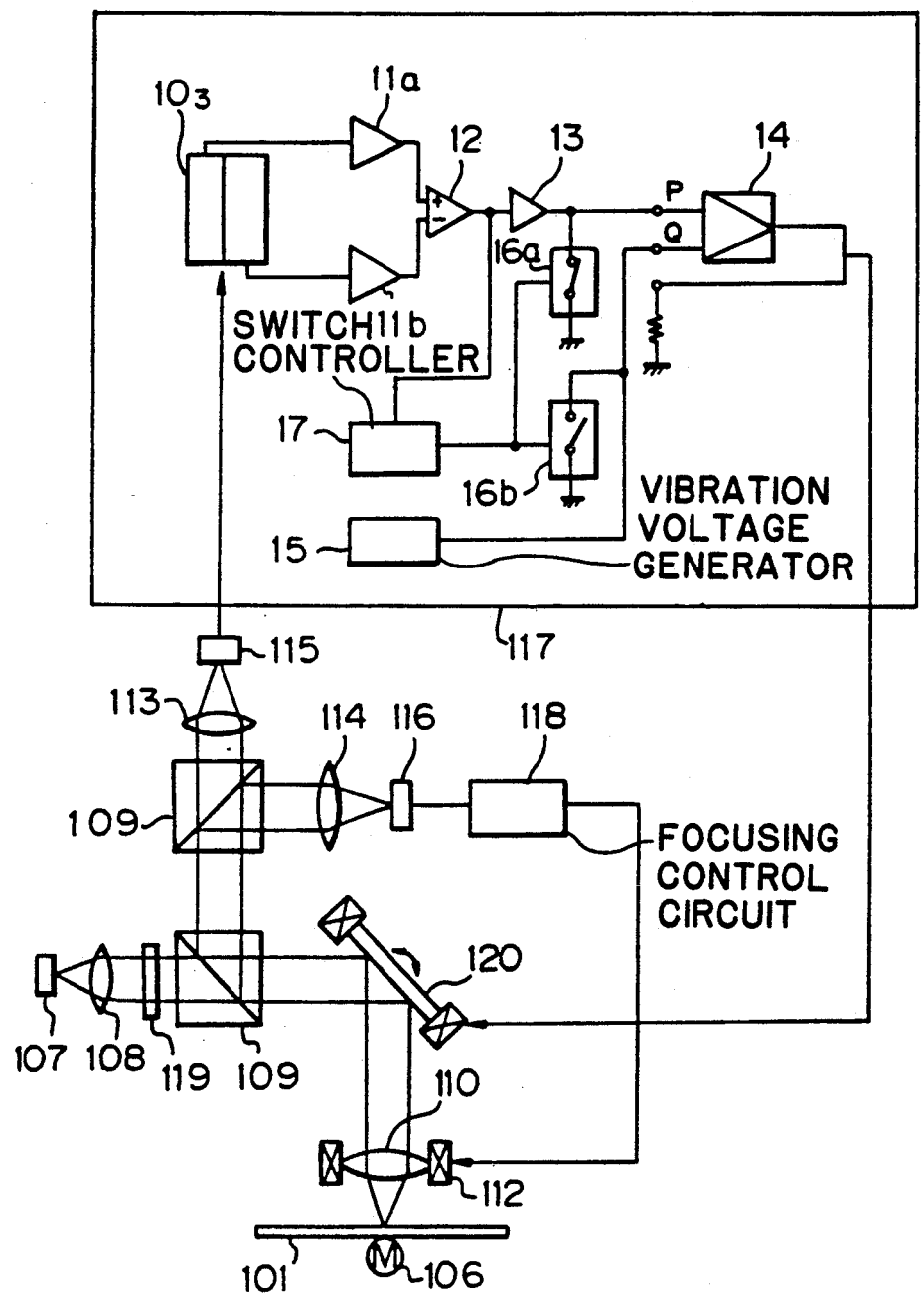
FIGS. 15 and 16 show other embodiments of an AT pull-in control unit of the present invention.

In the above embodiment, the light beam spot is vibrated by utilizing the objective lens 110. Alternatively, a rotating mirror 120 may be used to vibrate the light beam spot, as shown in FIG. 15. In this arrangement, crosstalk is prevented and a stable servo system may be provided.

Figure 16:
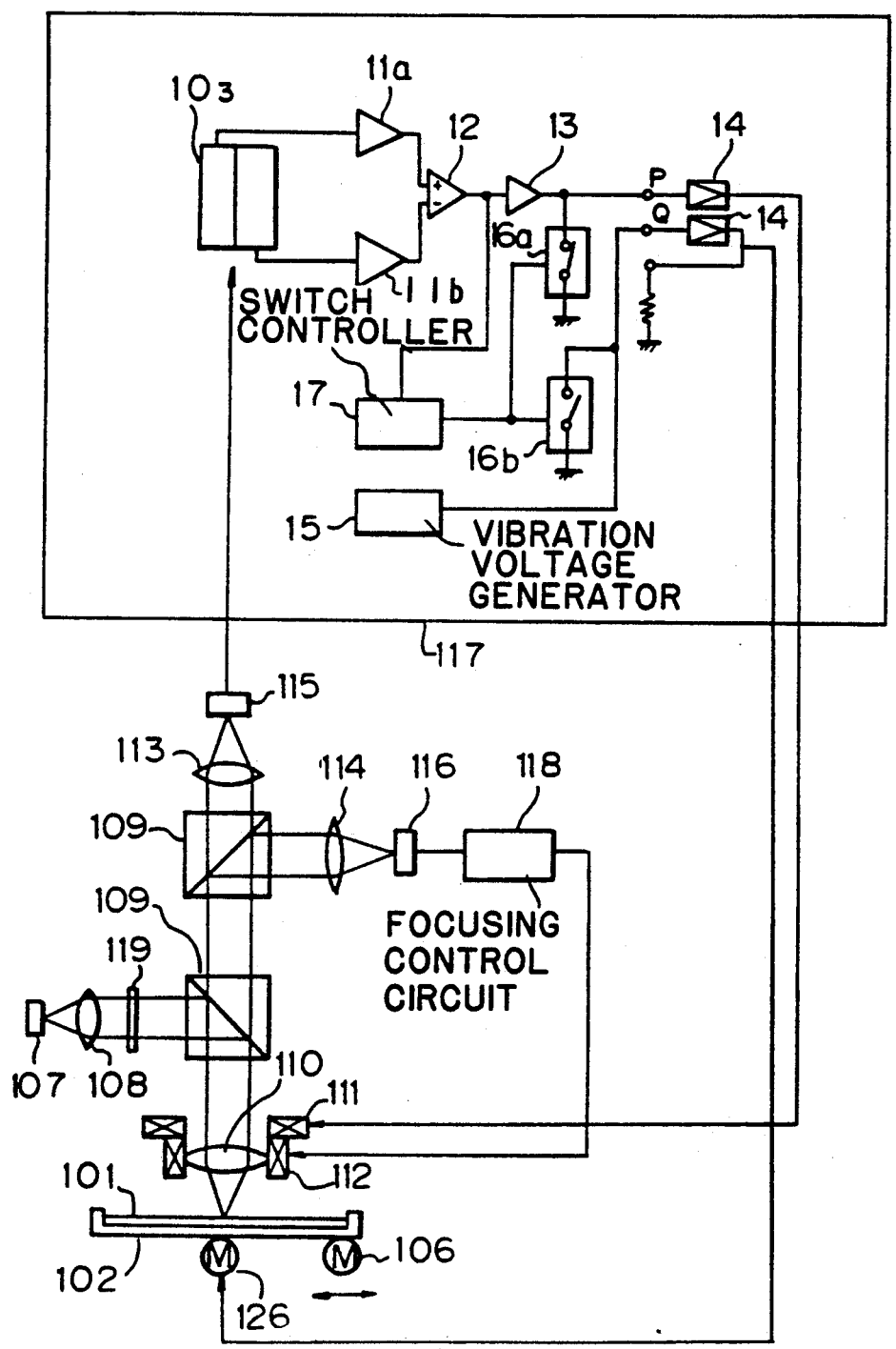

In the above embodiment, the AT pull-in is attained by vibrating the light beam spot. Alternatively, the optical card 101 may be vibrated by using a motor 126 as shown in FIG. 16. In this case, the optical card 101 is carried by a shuttle 102 which is vibrated by the motor 126.

In the above embodiment, the AT pull-in is attained by using the control system. The control system may also be used to compensate for off-tracking. For example, if the light beam spot is off-tracked from the target track, as shown in FIG. 10, when the information is read by a device external to the apparatus, it is compensated for by the control system. In this case, since there is no change in the signals derived from the three two-split sensors $10_1$, $10_2$ and $10_3$, it may be detected and the control system may cause the light beam spot to vibrate so that the light beam spot is driven back to the tracking control area.

In the above embodiment, a write-after-read type optical card is used as an information recording medium. Alternatively, other recording mediums having linear tracks available for tracking arranged in parallel, such as read-only or rewritable optical cards, may be used.

What is claimed is:

1. A tracking apparatus usable in an optical information recording and/or reproducing apparatus for an optical information recording medium on which a plurality of tracks are arranged substantially parallel in a first direction, said apparatus comprising:

a light source for emitting a light beam;

first optical means for forming a spot on the recording medium by converging the light beam from said light source;

second optical means for receiving the light beam from the recording medium;

detecting means for receiving the light beam received by said second optical means and for outputting a tracking signal;

vibrating means for vibrating the spot relative to the recording medium in a second direction intersecting the first direction;

control means for controlling the tracking of the spot with respect to a track;

determining means for determining whether the spot is in a control area of a tracking servo loop or out of the control area by detecting the tracking signal output by said detecting means and for outputting a determination result; and selecting means for selectively actuating said control means when the spot is in the control area of the tracking servo loop, and for selectively actuating said vibrating means when the spot is out of the control area, in accordance with the determination result output by said determining means.

2. An apparatus according to claim 1 wherein said vibrating means vibrates an objective lens of said first optical means to vibrate the spot.

3. An apparatus according to claim 1 wherein said vibrating means vibrates the recording medium to vibrate the spot.

4. An apparatus according to claim 1 wherein said vibrating means vibrates a rotating mirror of said first optical means to vibrate the spot.

5. A tracking apparatus usable in an optical information recording and/or reproducing apparatus for an optical information recording medium on which a plurality of tracks are arranged substantially parallel in a first direction, said apparatus comprising:
a light source for emitting a light beam;
first optical means for forming a spot on the recording medium by converging a light beam from said light source;
second optical means for obtaining the light beam from the recording medium;
detecting means for receiving the light beam obtained by said second optical means and for outputting a tracking signal;
vibrating means for vibrating the spot relative to the recording medium in a second direction intersecting the first direction, wherein said vibrating means vibrates the spot at an amplitude substantially equal to a pitch between tracks;
control means for controlling the tracking of the spot with respect to a track; and
selecting means for selectively actuating said vibrating means and said control means in accordance with the tracking signal output by said detecting means.

6. An optical information recording and/or reproducing apparatus for use with an optical information recording medium on which a plurality of tracks are arranged substantially parallel in a first direction, said apparatus comprising:
a light source for emitting a light beam;
first optical means for forming a spot on the recording medium by converging the light beam from said light source;
second optical means for obtaining the light beam from the recording medium;
first detecting means for receiving the light beam obtained by said second optical means and for outputting a reproducing signal;
second detecting means for receiving the light beam obtained by said second optical means and for outputting a tracking signal;
vibrating means for vibrating the spot in a second direction intersecting the first direction at an amplitude substantially corresponding to a pitch between tracks;
control means for controlling the tracking of the spot relative to a track; and
selecting means for selectively actuating said vibrating means and said control means in accordance with the tracking signal output be said second detecting means.

7. An apparatus according to claim 6 wherein said vibrating means vibrates an objective lens of said first optical means to vibrate the spot.

8. An apparatus according to claim 6, wherein said vibrating means vibrates the recording medium to vibrate the spot.

9. An apparatus according to claim 6, wherein said vibrating means vibrates a rotating mirror of said first optical means to vibrate the spot.

10. An optical information recording and/or reproducing apparatus for use with an optical information recording medium on which a plurality of tracks are arranged substantially parallel in a first direction, said apparatus comprising:
a light source for emitting a light beam;
first optical means for forming a spot on the recording medium by converging the light beam from said light source;
second optical means for receiving the light beam from the recording medium;
first detecting means for receiving the light beam received by said second optical means and for outputting a reproducing signal;
second detecting means for receiving the light beam received by said second optical means and for outputting a tracking signal having a detectable level;
vibrating means for vibrating the spot relative to the recording medium in a second direction intersecting the first direction;
control means for controlling tracking of the spot relative to a track;
determining means for determining whether the spot is in a control area of a tracking control loop or out of the control area by detecting the level of the tracking signal output by said second detecting means and for outputting a determination result; and
selecting means for selectively actuating said control means when the spot is in the control area of the tracking servo loop, and for selectively actuating said vibrating means when the spot is out of the control area, in accordance with the determination result output by said determining means.

11. A tracking servo control device usable in an optical information recording and/or reproducing apparatus in which an optical information recording medium on which a plurality of tracks are arranged substantially parallel in a first direction is scanned by a small spot, said control device comprising:
tracking detecting means for detecting a position of the spot with respect to a track in a second direction perpendicular to the first direction and for outputting a tracking signal having a detectable level;
vibrating means for vibrating the spot in the second direction;
control means for controlling the tracking of the spot relative to the track;
determining means for determining whether the spot is in a control area of a tracking servo loop or out of the control area by detecting the level of the tracking signal output by said detecting means and for outputting a determination result; and
selecting means for selectively actuating said control means when the spot is in the control area of the tracking servo loop, and for selectively actuating said vibrating means when the spot is out of the control area, in accordance with the determination output by said determining means.

12. A method for effecting tracking pull-in in an optical information recording and/or reproducing apparatus for use with an optical information recording medium on which a plurality of tracks are arranged substantially parallel in a first direction, said method comprising the steps of:

forming a spot on the recording medium by converging a light beam from a light source;

vibrating the spot with an amplitude substantially corresponding to a track pitch relative to the recording medium in a second direction intersecting the first direction;

determining whether the spot is in a control area of a tracking servo loop or out of the control area; and stopping vibration of the spot and actuating the tracking servo loop of the spot.

13. A method for effecting tracking pull-in in an optical information recording and/or reproducing apparatus for use with an optical information recording medium on which a plurality of tracks are arranged substantially parallel in a first direction, said method comprising the steps of:

forming a spot on the recording medium by converging a light beam from a light source;

determining whether the spot is in a control area of a tracking servo loop or out of the control area;

inhibiting the tracking servo loop when the spot is out of the tracking control are of the tracking servo loop;

vibrating the spot with an amplitude substantially corresponding to a track pitch relative to the recording medium in a second direction intersecting the first direction when the tracking servo loop has been inhibited; and stopping vibration of the spot and actuating the tracking servo loop of the spot.

14. A method for effecting tracking pull-in in an optical information recording and/or reproducing apparatus for use with an optical information recording medium, said method comprising the steps of:

forming a spot on the recording medium by converging a light beam from a light source;

vibrating the spot with an amplitude substantially corresponding to a track pitch relative to the recording medium in a track intersecting direction;

determining whether the spot is in a control area of a tracking servo loop or out of the control area; and stopping vibration of the spot and actuating the tracking servo loop of the spot.

15. A method for effecting tracking pull-in in an optical information recording and/or reproducing apparatus for use with an optical information recording medium, said method comprising the steps of:

forming a spot on the recording medium by converging a light beam from a light source;

determining whether the spot is in a control area of a tracking servo loop or out of the control area;

inhibiting the tracking servo loop when the spot is out of the tracking control area of the tracking servo loop;

vibrating the spot with an amplitude substantially corresponding to a track pitch relative to the recording medium in a track intersecting direction when the tracking servo loop has been inhibited; and stopping vibration of the spot and actuating the tracking servo loop of the spot.

16. A tracking apparatus usable in an optical information recording and/or reproducing apparatus for use with an optical information recording medium, said apparatus comprising:

a light source for emitting a light beam;

first optical means for forming a spot on the recording medium by converging the light beam from said light source;

second optical means for receiving the light beam from the recording medium;

detecting means for receiving the light beam received by said second optical means and for outputting a tracking signal;

vibrating means for vibrating the spot relative to the recording medium in a track intersecting direction;

control means for controlling the tracking of the spot with respect to a track;

determining means for determining whether the spot is in a control area of a tracking servo lop or out of the control area by detecting the tracking signal output by said detecting means and for outputting a determination result; and selecting means for selectively actuating said control means when the spot is in the control area of the tracking servo loop, and for selectively actuating said vibrating means when the spot is out of the control area, in accordance with the determination result output by said determining means.

17. An optical information recording and/or reproducing apparatus for use with an optical information recording medium, said apparatus comprising:

a light source for outputting a light beam;

first optical means for forming a spot on the recording medium by converging the light beam from said light source;

second optical means for receiving the light beam from the recording medium;

first detecting means for receiving the light beam received by said second optical means and for outputting a reproducing signal;

second detecting means for receiving the light beam received by said second optical means for outputting a tracking signal;

vibrating means for vibrating the spot relative to the recording medium in a track intersecting direction;

control means for controlling tracking of the spot with respect to a track;

determining means for determining whether the spot is in a control area of a tracking servo loop or out of the control area by detecting the tracking signal output by said second detecting means and for outputting a determination result; and selecting means for selectively actuating said control means when the spot is in the control area of the tracking servo loop, and for selectively actuating said vibrating means when the spot is out of the control area, in accordance with the determination result output by said determining means.

18. A tracking servo control device usable in an optical information recording and/or reproducing apparatus in which an optical information recording medium having tracks arranged in a track direction is scanned by a spot, said apparatus comprising:

tracking detecting means for detecting position of the spot with respect to a track in a direction perpendicular to the track direction and for outputting a tracking signal;

vibrating means for vibrating the spot in a direction perpendicular to the track direction;

control means for controlling tracking of the spot with respect to a track;

determining means for determining whether the spot is in a control area of a tracking servo loop or out of the control area by detecting the tracking signal output by said tracking detecting means and for outputting a determination result; and selecting means for selectively actuating said control means when the spot is in the control area of the tracking servo loop, and for selectively actuating said vibrating means when the spot is out of the control area, in accordance with the determination result output by said determining means.

19. A method of recording information on and/or reproducing information from an optical information recording medium having a plurality of tracks, said method comprising the steps of:

forming a light spot on the recording medium by converging a light beam from a light source;

detecting a light beam reflected from the recording medium, and producing a detection result;

generating a tracking error signal indicative of the positional relation between the light spot and a given track on the optical information recording medium in accordance with the detection result produced in said detecting step;

controlling tracking of the light spot with respect to the track based on the tracking error signal generated in said generating step;

vibrating the light spot in a direction intersecting the track;

determining whether the light spot is in a control area of a tracking servo loop or out of the control area based on the tracking error signal generated in the generating step, and producing a determination result; and selecting one of a controlling operation in said controlling step and a vibrating operation in said vibrating step in accordance with the determination result produced in said determining step such that the controlling operation is selected when the light spot is in the control area of the tracking servo loop and the vibrating operation is selected when the light spot is out of the control area of the tracking servo loop.

* * * * *

UNITED STATES PATENT AND TRADEMARK OFFICE
CERTIFICATE OF CORRECTION

PATENT NO. : 5,163,034
DATED : November 10, 1992
INVENTOR(S) : Hiroto Kitai, et al.

It is certified that error appears in the above-identified patent and that said Letters Patent is hereby corrected as shown below:

COLUMN 1

Line 55, "31," should read --$3_1$,--; and
　　　Line 56, "32, 33, ..." should read --$3_2$, $3_3$, ...--.

COLUMN 2

Line 64, "mode:" should read --mode.--.

COLUMN 3

Line 39, "hence" should read --hence,--.

COLUMN 5

Line 32, "Thus" should read --Thus,--.

UNITED STATES PATENT AND TRADEMARK OFFICE
CERTIFICATE OF CORRECTION

PATENT NO. : 5,163,034
DATED : November 10, 1992
INVENTOR(S) : Hiroto Kitai, et al.

It is certified that error appears in the above-identified patent and that said Letters Patent is hereby corrected as shown below:

COLUMN 7

Line 7, "claim 1" should read --claim 1,--;
Line 10, "claim 1" should read --claim 1,--; and
Line 13, "claim 1" should read --claim 1,--.

COLUMN 8

Line 1, "claim 6" should read --claim 6,--.

COLUMN 9

Line 30, "are" should read --area--.

Signed and Sealed this

Thirtieth Day of November, 1993

Attest:

BRUCE LEHMAN

*Attesting Officer*　　　*Commissioner of Patents and Trademarks*